US012563286B2

(12) United States Patent
Liao

(10) Patent No.: US 12,563,286 B2
(45) Date of Patent: Feb. 24, 2026

(54) METHOD AND MOBILE DEVICE FOR CAPTURING AN IMAGE OF A FOOT USING AUGMENTED REALITY

(71) Applicant: DELTA SHOE TECH LTD., Taichung City (TW)

(72) Inventor: Tsung-E Liao, Taichung City (TW)

(73) Assignee: DELTA SHOE TECH LTD., Taichung City (TW)

( * ) Notice: Subject to any disclaimer, the term of this patent is extended or adjusted under 35 U.S.C. 154(b) by 163 days.

(21) Appl. No.: 18/534,477

(22) Filed: Dec. 8, 2023

(65) Prior Publication Data

US 2025/0193513 A1     Jun. 12, 2025

(51) Int. Cl.

| | |
|---|---|
| *H04N 23/60* | (2023.01) |
| *G06T 7/60* | (2017.01) |
| *G06T 11/00* | (2006.01) |
| *G06V 20/20* | (2022.01) |
| *G06V 20/60* | (2022.01) |
| *G06V 40/10* | (2022.01) |
| *H04N 23/611* | (2023.01) |
| *H04N 23/63* | (2023.01) |

(52) U.S. Cl.
CPC .............. *H04N 23/64* (2023.01); *G06T 7/60* (2013.01); *G06T 11/00* (2013.01); *G06V 20/20* (2022.01); *G06V 20/60* (2022.01); *G06V 40/10* (2022.01); *H04N 23/611* (2023.01); *H04N 23/63* (2023.01); *G06T 2207/30196* (2013.01)

(58) Field of Classification Search
CPC ...... H04N 23/64; H04N 23/611; H04N 23/63; G06T 7/60; G06T 11/00; G06T 2207/30196; G06T 7/00; G06T 7/70; G06T 7/73; G06T 19/00; G06T 19/20; G06V 20/20; G06V 20/60; G06V 40/10
See application file for complete search history.

(56) References Cited

U.S. PATENT DOCUMENTS

| | | | | |
|---|---|---|---|---|
| 2013/0307851 | A1* | 11/2013 | Hernandez | .............. G06T 17/00 |
| | | | | 345/420 |
| 2016/0286906 | A1* | 10/2016 | Malal | ..................... A43B 17/00 |
| 2018/0247426 | A1* | 8/2018 | Gluck | ................ G06Q 30/0643 |
| 2019/0028637 | A1* | 1/2019 | Kolesov | .................... G06T 7/73 |
| 2020/0311429 | A1* | 10/2020 | Chen | ..................... A61B 5/1116 |
| 2021/0321035 | A1* | 10/2021 | Sherrah | .................. G06V 40/10 |
| 2023/0052613 | A1* | 2/2023 | Kamiyama | .......... G06V 40/103 |
| 2023/0342964 | A1* | 10/2023 | Tsutsui | .................... G06T 7/579 |

* cited by examiner

*Primary Examiner* — Albert H Cutler
(74) *Attorney, Agent, or Firm* — Womble Bond Dickinson (US) LLP

(57) ABSTRACT

A method for capturing an image of a foot form a specific perspective using augmented reality (AR) includes generating an AR space based on a set of dimensions of a reference object, generating and displaying an AR foot placement object near the reference object, when a foot is on the AR foot placement object, generating and displaying an AR alignment object, a two-dimensional (2D) alignment object, an moving alignment object and a stationary alignment object; and when the 2D alignment object encloses the AR alignment object and the stationary alignment object encloses the moving alignment object, capturing an image related to the foot.

20 Claims, 7 Drawing Sheets

METHOD AND MOBILE DEVICE FOR CAPTURING AN IMAGE OF A FOOT USING AUGMENTED REALITY

FIELD

The disclosure relates to a method and a mobile device for capturing images of a foot, and more particularly to a method and a mobile device for capturing an image of a foot from a specific perspective using augmented reality.

BACKGROUND

In the field of shoe shopping, the application of shoe-fitting is very important as both the shoe shopping done in brick-and-mortar stores and online stores involve proper shoe sizing. In the cases that physical shoe-fitting is unavailable, various ways of estimating the shoe size of a customer have recently been developed using images of the customer's feet. Specifically, images of the feet of the customer may be taken using a mobile device with a camera, and then sent to a server that execute an analysis program to determine a number of size parameters associated with the feet of the customer. With the size parameters, a suggested shoe size may be determined and shoes with the suitable size may be provided to the customer.

SUMMARY

One object of the disclosure is to provide a method that may be implemented to more efficiently capture augmented reality (AR) images for a foot.

According to one embodiment of the disclosure, a method for capturing an image of a foot from a specific perspective using augmented reality (AR), the method to be implemented using a mobile device that includes a processor, a data storage that stores a software application, a camera, a motion sensor and a display. The method includes:

a) by the processor that executes the software application, controlling the camera to activate and capture images, and controlling the display to display the images captured by the camera;

b) in response to detection of a reference object in the images captured by the camera, determining a set of dimensions for the reference object based on a kind of the reference object;

c) generating an AR space based on the set of dimensions of the reference object;

d) obtaining a foot image instruction that indicates a specific foot and an associated part of the specific foot for image-taking;

e) generating an AR foot placement object in the AR space based on the foot image instruction, and controlling the display to display the AR foot placement object in proximity to the reference object;

f) in response to detection of a foot on the AR foot placement object, generating an AR alignment object in the AR space, a two-dimensional (2D) alignment object, a moving alignment object and a stationary alignment object, and controlling the display to display the AR alignment object, the 2D alignment object, the moving alignment object and the stationary alignment object, wherein, the AR alignment object is located at a fixed relative position with respect to the reference object in the AR space, a location of the 2D alignment object on the display and a location of the stationary alignment object on the display are fixed, and a location of the moving alignment object on the display is calculated based on a location of the stationary alignment object on the display, the current orientation dataset and the predetermined orientation dataset; and g) in response to detection that the AR alignment object is moved to be enclosed by the 2D alignment object, and that the moving alignment object is moved to be enclosed by the stationary alignment object, controlling the camera to capture an image related to the foot.

Another object of the disclosure is to provide a mobile device that is configured to implement the above-mentioned method.

According to one embodiment of the disclosure, the mobile device is for capturing an image of a foot from a specific perspective using augmented reality (AR). The mobile device includes a processor, a data storage that stores a software application, a camera, a motion sensor and a display. The processor executing the software application implements the operations of:

controlling the camera to activate and capture images, and controlling the display to display the images captured by the camera;

in response to detection of a reference object in the images captured by the camera, determining a set of dimensions for the reference object based on a kind of the reference object;

generating an AR space based on the set of dimensions of the reference object;

obtaining a foot image instruction that indicates a specific foot and an associated part of the specific foot for image-taking;

generating an AR foot placement object in the AR space based on the foot image instruction, and controlling the display to display the AR foot placement object in proximity to the reference object;

in response to detection of a foot on the AR foot placement object, generating an AR alignment object in the AR space, a two-dimensional (2D) alignment object, a moving alignment object and a stationary alignment object, and controlling the display to display the AR alignment object, the 2D alignment object, the moving alignment object and the stationary alignment object, wherein, the AR alignment object is located at a fixed relative position with respect to the reference object in the AR space, a location of the 2D alignment object on the display and a location of the stationary alignment object on the display are fixed, and a location of the moving alignment object on the display is calculated based on a location of the stationary alignment object on the display, the current orientation dataset and the predetermined orientation dataset; and in response to detection that the AR alignment object is moved to be enclosed by the 2D alignment object, and that the moving alignment object is moved to be enclosed by the stationary alignment object, controlling the camera to capture an image related to the foot.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
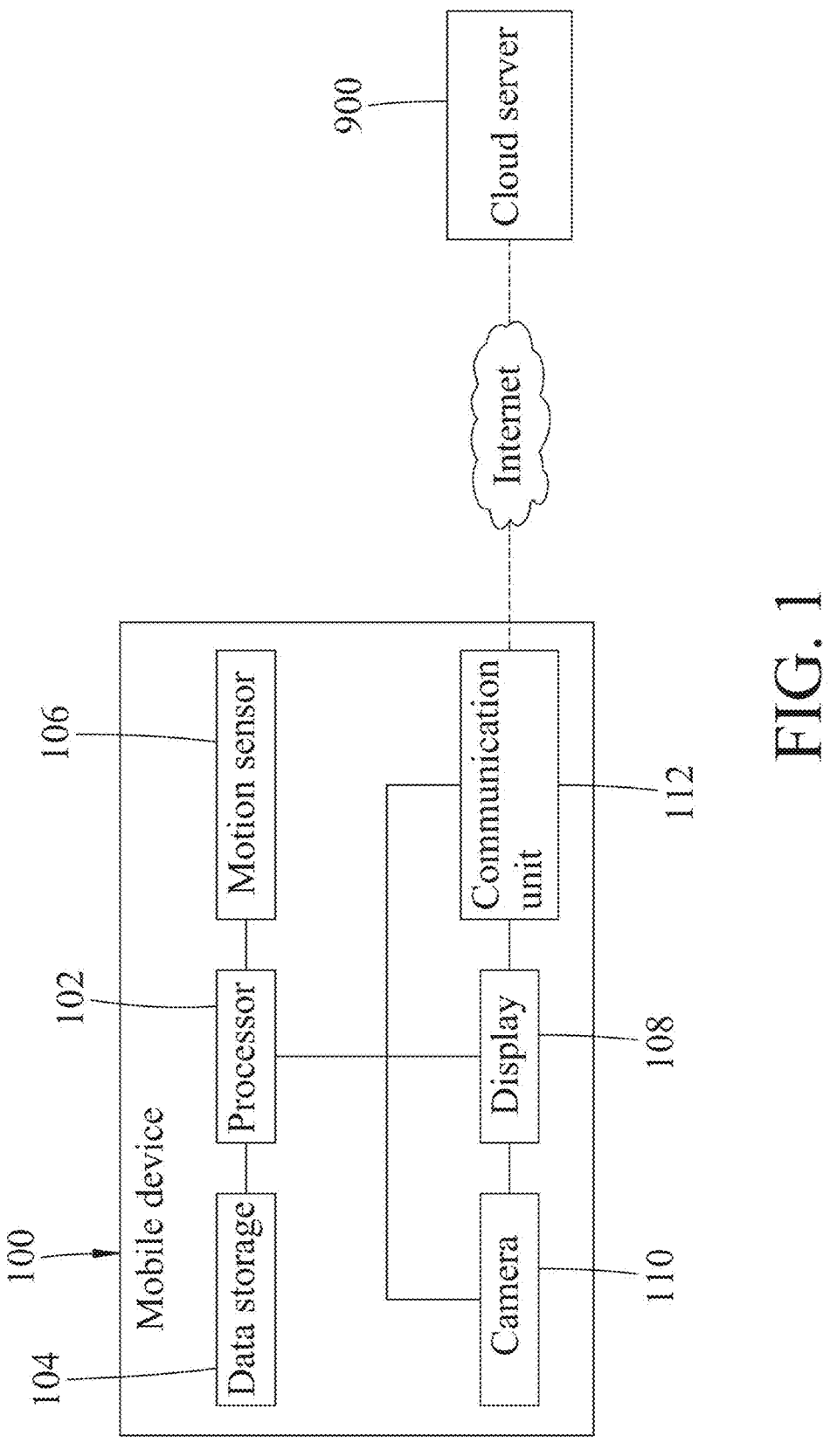
FIG. 1 is a block diagram illustrating components of a mobile device to be used for capturing images of a foot from a specific perspective using augmented reality (AR) according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIG. 1 is a block diagram illustrating components of a mobile device 100 to be used for capturing images of a foot according to one embodiment of the disclosure.

In embodiments, the mobile device 100 may be embodied using a smart phone, a tablet, a laptop, or other suitable mobile devices. In this embodiment, the mobile device 100 is embodied using a mobile phone and includes a processor 102, a data storage 104, a motion sensor 106, a display 108, a camera 110, and a communication unit 112.

The processor 102 may be embodied using a central processing unit (CPU), a microprocessor, a microcontroller, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), and/or etc.

The data storage 104 is connected to the processor 102, and may be embodied using, for example, random access memory (RAM), read only memory (ROM), programmable ROM (PROM), firmware, flash memory, etc. In this embodiment, the data storage 104 stores a software application therein. The software application includes instructions that, when executed by the processor 102, cause the processor 102 to implement the operations as described below. In this embodiment, the software application may be one constructed using an augmented reality (AR)-related toolkit such as ARKit®, ARCore™, etc. In addition, the data storage 104 includes a database that includes data associated with a plurality of reference objects. In this embodiment, each of the reference objects is a particular paper banknote, and the data associated with each of the reference objects includes a length and a width. It is noted that in other embodiments, other objects may be selected as the reference objects.

The motion sensor 106 is connected to the processor 102, and may be implemented using an accelerometer that is built in the mobile device 100, and may be configured to detect data associated with the motion and location of the mobile device 100. For example, in this embodiment, the motion sensor 106 is configured to detect the rotations of the mobile device 100 about a longitudinal axis of the mobile device 100 (represented using a roll value), the rotations of the mobile device 100 about a transverse axis of the mobile device 100 perpendicular to the longitudinal axis, (represented using a pitch value), and the rotations of the mobile device 100 about a normal axis of the of the mobile device 100 perpendicular to the longitudinal axis and the transverse axis (represented using a yaw value). In use, when activated, the motion sensor 106 may be configured to detect a current orientation of the mobile device 100, and output a current orientation dataset to the processor 102. The current orientation dataset may include at least a pitch value, a roll value and a yaw value. In one example, when the mobile device 100 is placed on the ground or is disposed parallel to a horizontal plane, each of the pitch value, the roll value and the yaw value may be 0 degrees.

The display 108 is connected to the processor 102, and may be embodied using a touchscreen or other display screen, and is controlled by the processor 102 to display images and a graphic user interface (GUI).

The camera 110 is connected to the processor 102, and may be embodied using a rear-facing camera built in the mobile device 100, and is configured to capture images.

The communication unit 112 is connected to the processor 102, and may include one or more of a radio-frequency integrated circuit (RFIC), a short-range wireless communication module supporting a short-range wireless communication network using a wireless technology of Bluetooth® and/or Wi-Fi, etc., and a mobile communication module supporting telecommunication using Long-Term Evolution (LTE), the third generation (3G), the fourth generation (4G) or fifth generation (5G) of wireless mobile telecommunications technology, or the like. The communication unit 112 enables the mobile device 100 to communicate with a remote server such as a cloud server 900 via a wireless network (e.g., the Internet).

In use, when a user intends to do a shoe fitting operation (e.g., in the event of shoe shopping), he/she may operate the mobile device 100 to execute the software application, so as to initiate a method for capturing an image of a foot from a specific perspective using augmented reality.

Figure 2A:
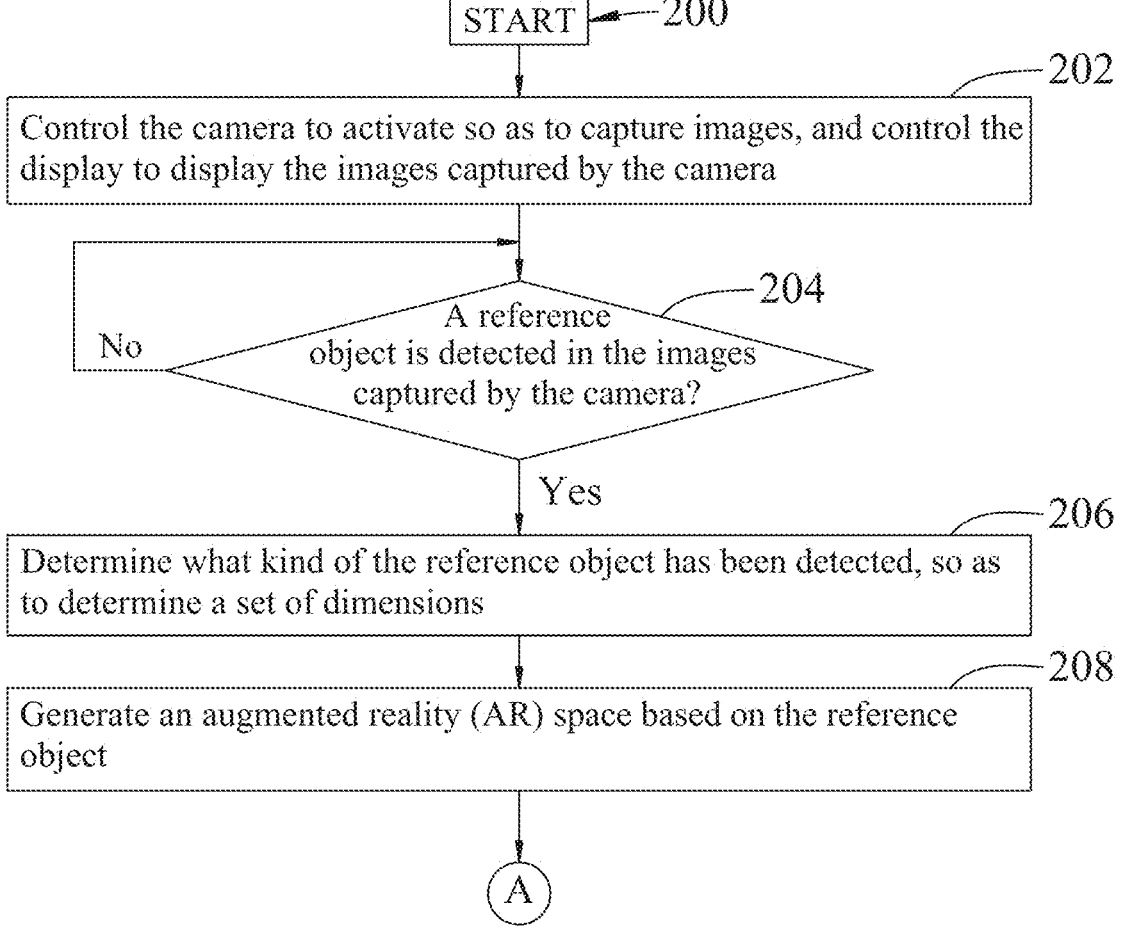
FIGS. 2A and 2B illustrate a flow chart showing steps of a method for capturing images of a foot from a specific perspective using AR according to the disclosure.
Figure 2B:
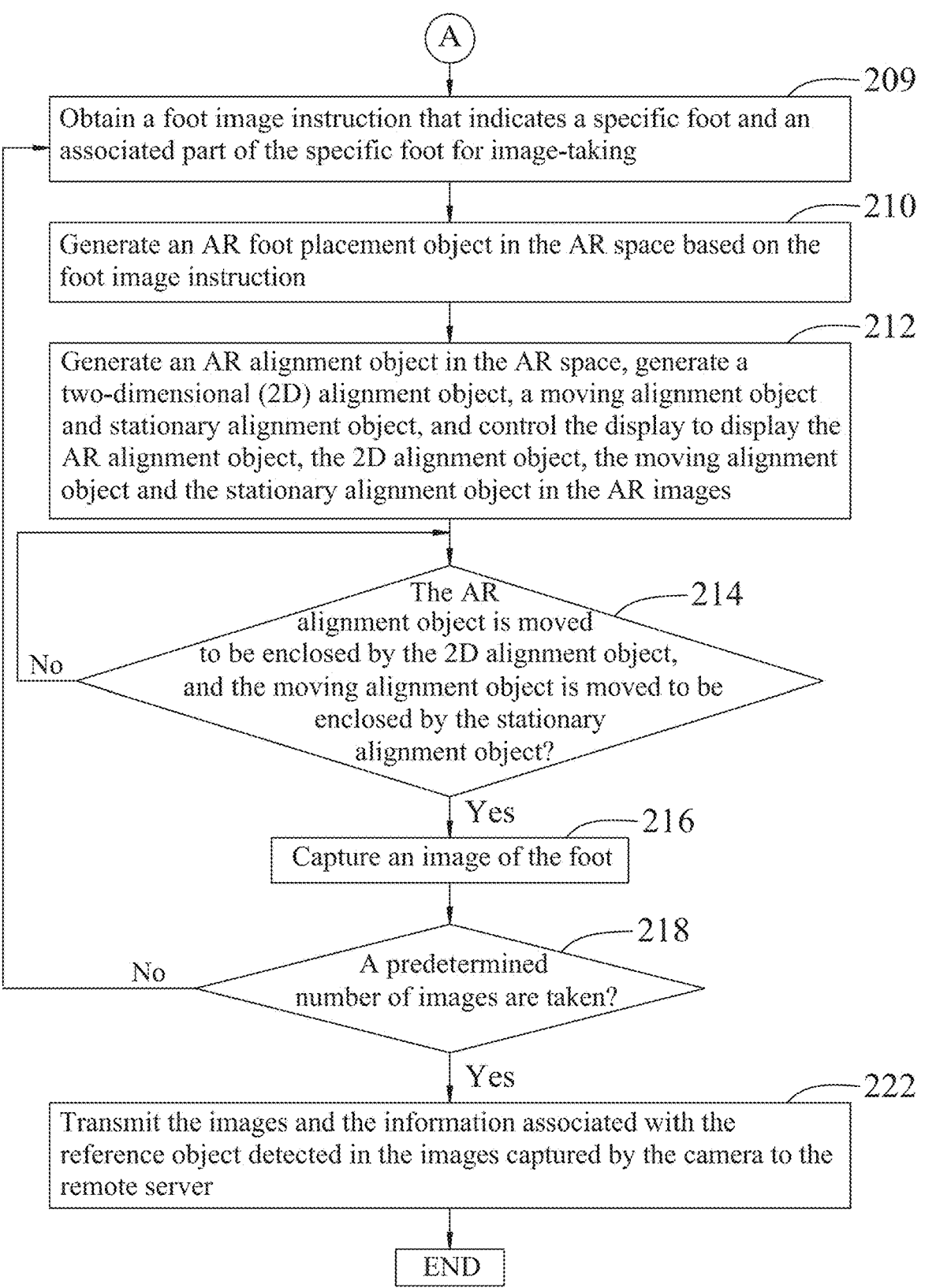

FIGS. 2A and 2B illustrate a flow chart showing steps of a method 200 for capturing an image of a foot from a specific perspective using augmented reality (AR) according to one embodiment of the disclosure. In this embodiment, the method 200 is implemented using the mobile device 100 as shown in FIG. 1. In use, the mobile device 100 may be held by the user, by another person or supported by a phone stand.

In step 202, in response to receipt of an instruction of execution of the software application, the processor 102 executing the software application controls the camera 110 to activate so as to capture images, and controls the display

108 to display the images captured by the camera 110. In embodiments, the processor 102 may further control the display 108 to display a message instructing the user to place the reference object 300 (e.g., any paper banknote) on the ground, and to move the mobile device 100 such that the reference object 300 is within a field of view of the camera 110.

In step 204, the processor 102 determines whether a reference object 300 is detected in the images captured by the camera 110. Specifically, the processor 102 may execute an object recognition algorithm to determine whether a reference object 300 is detected in the images captured by the camera 110. It is noted that the object recognition algorithm used in this embodiment may be one that is commercially available, and details thereof are omitted herein for the sake of brevity. When a reference object 300 is detected, the flow proceeds to step 206. Otherwise, the flow remains at step 204.

In step 206, in response to detection of the reference object 300 in the images, the processor 102 determines what kind of the reference object 300 has been detected, so as to determine a set of dimensions (e.g., a length and a width) for the reference object 300 detected. In this embodiment, the reference object 300 is a paper banknote, and the processor 102 determines what kind of paper banknote has been detected.

For example, in the case of New Taiwan Dollar (NTD) paper banknotes, five different kinds of paper banknotes are present, each representing a specific value (i.e., $100, $200, $500, $1000 and $2000, respectively) and having a set of specific dimensions (e.g., a $100 paper banknote is 145*70 millimeters, while a $1000 paper banknote is 160*70 millimeters). For example, in this embodiment, the reference object 300 may be an NTD $100 paper banknote. Paper banknote generally have a rectangular shape, with two long sides and two short sides.

In use, the processor 102 may access the database to compare the reference object 300 thus detected with the data included in the database so as to determine the kind of the reference object 300, and subsequently to obtain the set of dimensions of the reference object 300. It is noted that the operations of making comparisons and determining which object is in the image are well known in the related art, and details thereof are omitted herein for the sake of brevity.

Then, in step 208, the processor 102 generates an augmented reality (AR) space based on the reference object 300. Specifically, the processor generates the AR space based on the set of dimensions of the reference object 300. In embodiments, the AR space includes a scene that is in the field of view of the camera 110 and is where AR objects are to be placed. It is noted that the operations of generating the AR space is well known in the related art, and details thereof are omitted herein for the sake of brevity.

In step 209, the processor 102 obtains a foot image instruction that indicates a specific foot and an associated part of the specific foot for image-taking. For example, the foot image instruction may indicate which foot and which part of the foot is used for image-taking. Generally, in order to obtain more complete data for calculating foot shape, more than one image may be needed. In some embodiments, three different images of a foot, each being related to an instep (from a top-down position), an arch (from a side position) and a heel (from a side position) of the foot, are needed to measure each foot. As such, a total of six images may be taken for both feet of the user. It is noted that in different embodiments, a different number of images, associated with various parts of each foot, may be taken, and is not limited to the embodiments in the disclosure. In embodiments, the foot image instruction may be inputted by the user through the GUI, or may be generated by the processor 102 that executes the software application after a previous foot image has been captured.

Afterward, in step 210, the processor 102 generates an AR foot placement object 310 in the AR space based on the foot image instruction of step 209 (e.g., depending on which foot and which part of the foot for image-taking), and controls the display 108 to display the AR foot placement object 310 in proximity to the reference object 300. It is noted that, images that are captured by the camera and displayed on the display 108 with AR objects (e.g., the AR foot placement object 310) may be referred to as AR images. Additionally, since the AR foot placement object 310 is projected into the AR space and is in proximity to the reference object 300, when the mobile device 100 (i.e., the camera 110, the "point of view" of the AR space) moves, a location of the reference object 300 in the AR images moves and a location of the AR foot placement object 310 in the AR images moves correspondingly.

Figure 3:
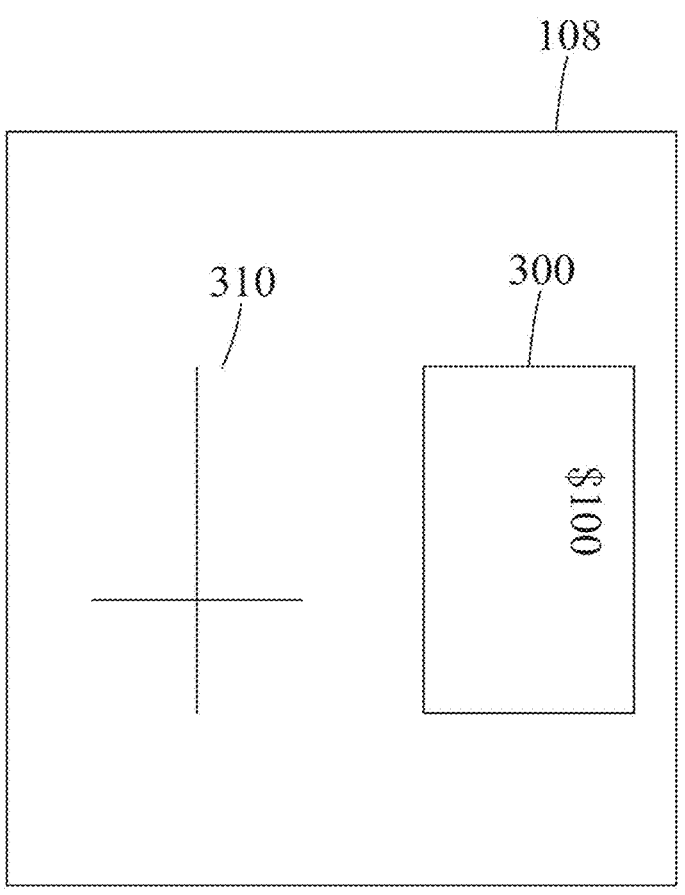
FIG. 3 illustrates an exemplary AR image displayed on a display, showing an AR foot placement object being displayed in proximity to a reference object.

FIG. 3 illustrates an exemplary AR image displayed on the display 108, showing an AR foot placement object 310 being displayed in proximity to the reference object 300. Specifically, in the example of FIG. 3, the AR foot placement object 310 is cross shaped, is placed on one side of the reference object 300 (e.g., left or right side, depending on the intended foot to be captured in the image) and has a distance from the reference object 300 in the AR space of about 10 centimeters. In embodiments, in step 210 the processor 102 may further generate instructions for the user, to be displayed by the display 108. The instructions may include texts such as "please place your left/right foot on the cross, and place your heel on the intersection" and/or arrows pointed at the AR foot placement object 310. It is noted that FIG. 3 is associated with an instep of the left foot, which is from the foot image instruction of step 209.

In the example of FIG. 3, the mobile device 100 is held or placed in a portrait mode, and the reference object 300 is placed vertically in the AR image (i.e., the long sides extend in a vertical direction and the short sides extend in a horizontal direction). The AR foot placement object 310 is located on a left long side of the reference object 300, and is for capturing images for the left foot. On the other hand, for capturing images for the right foot, the AR foot placement object 310 is located on a right long side of the reference object 300, with an approximately same distance in the AR space (e.g., about 10 centimeters). In some embodiments, the processor 102 may control the display 108 to display a message instructing the user to move the mobile device 100, so as to place the mobile device 100 in one of the portrait mode and a landscape mode, based on the associated part of the foot for taking an image.

In response, the user may place his/her left foot "on the AR foot placement object 310", as seen from the AR images captured by the camera 110. Then, the user may operate the mobile device 100 (e.g., pressing an OK button) to trigger the flow to proceed to step 212. In embodiments, in response to detection of a foot on the AR foot placement object 310 in the AR images by the processor 102, the flow proceeds to step 212. In embodiments, after user operation to trigger the next step 212 or after detection of a foot, the AR foot placement object 310 is no longer displayed in the AR images.

In step 212, the processor 102 generates an AR alignment object in the AR space, generates a two-dimensional (2D) alignment object, a moving alignment object and a stationary alignment object, and controls the display 108 to display the AR alignment object, the 2D alignment object, the moving alignment object and the stationary alignment object in the AR images.

Figure 4:
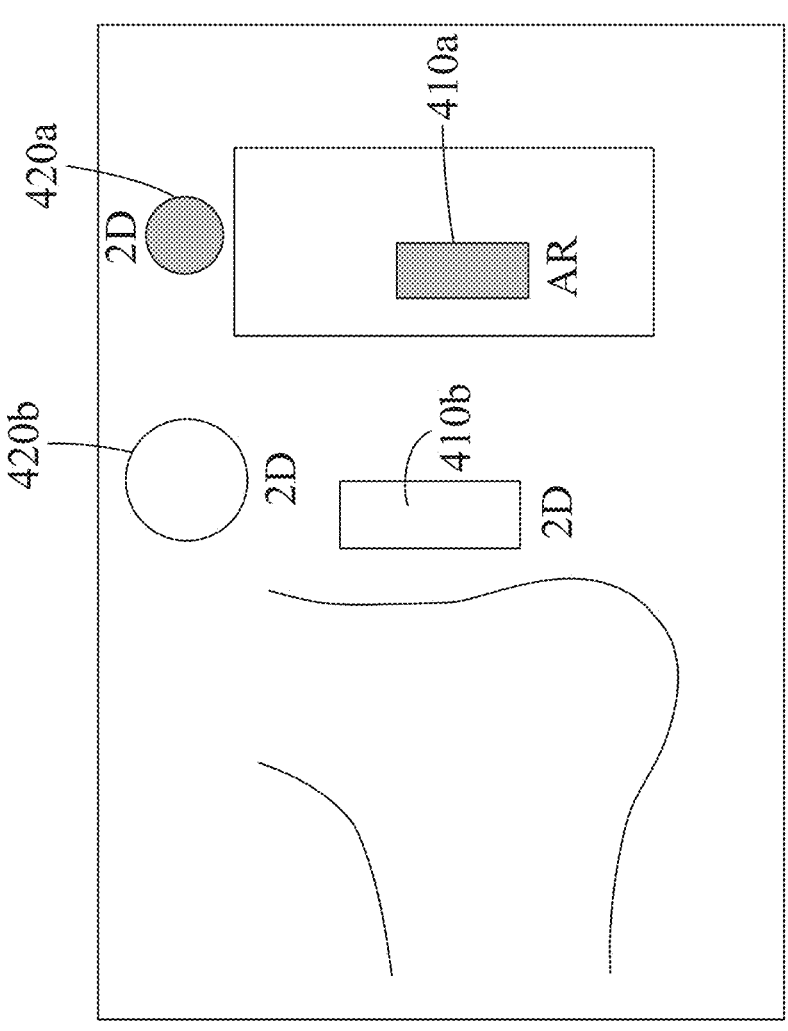
FIG. 4 is an exemplary AR image for a heel of a left foot, illustrating an AR alignment object, a two-dimensional (2D) alignment object, a moving alignment object and a stationary alignment object according to one embodiment of the disclosure.

FIG. 4 is an exemplary AR image illustrating an AR alignment object 410*a*, a 2D alignment object 410*b*, a moving alignment object 420*a* and a stationary alignment object 420*b* according to one embodiment of the disclosure. In the example of FIG. 4, the mobile device 100 is held or placed in the landscape mode, and the reference object 300 is placed vertically in the AR image (i.e., the long sides extend in a vertical direction and the short sides extend in a horizontal direction). It is noted that FIG. 4 is associated with a heel of the left foot, which is from the foot image instruction of step 209.

In this embodiment, the AR alignment object 410*a* has an appearance of a solid rectangular cuboid, is located at a fixed relative position with respect to the reference object 300 in the AR space, and has a side surface that is parallel to the long sides of the reference object 300. For example, the AR alignment object 410*a* may be set to appear on the display 108 at about 5 centimeters above and about 10 centimeters on the left of the reference object 300 in the AR space, but other placements may also be employed.

A location of the 2D alignment object 410*b* on the display 108 may be fixed. For instance, in the example of FIG. 4, the 2D alignment object 410*b* may be located in the middle of the display 108.

A location of the moving alignment object 420*a* relative to the stationary alignment object 420*b* may be generated based on the current orientation dataset generated by the motion sensor 106.

Specifically, in order to properly obtain image data of the foot, the mobile device 100 is to be placed such that the reference object 300 and the associated part of the foot can be captured in the images by the camera 110. Therefore, the AR alignment object 410*a* and the 2D alignment object 410*b* are designed to guide the user to move the mobile device 100 such that the AR alignment object 410*a* is in the fixed location of the 2D alignment object 410*b* on the display 108 (e.g., the middle of the display 108). Additionally, it is desirable to place the mobile device 100 in a designated orientation such that the camera 110 can be directed to a direction to capture an image of the specific part of the foot from a specific perspective. The designated orientation corresponds to the foot image instruction of step 209, and may be represented using a predetermined orientation dataset with a roll value, a pitch value and a yaw value. It is noted that each of the 2D alignment object 410*b* and the stationary alignment object 420*b* is not projected into the AR space, and when displayed on the display 108, does not move corresponding to movement of the mobile device 100 (i.e., will remain on a same location of the display 108 regardless of the movement of the mobile device 100).

A shape of the 2D alignment object 410*b* may be similar to a sectional shape of the AR alignment object 410*a* (e.g., a rectangle) or the shape of the AR alignment object 410*a* (in the case that the AR alignment object 410*a* is also a rectangle). In the embodiment of FIG. 4, the 2D alignment object 410*b* has a shape of a hollow rectangle. A size of the 2D alignment object 410*b* may be similar to or slightly larger than that of the sectional shape of the AR alignment object 410*a*. It is noted that while in the embodiment of FIG. 4, the AR alignment object 410*a* has an appearance of a solid rectangular cuboid and the 2D alignment object 410*b* has a shape of a hollow rectangle, in other embodiments, the AR alignment object 410*a* and the 2D alignment object 410*b* may have other shapes. In some embodiments, the AR alignment object 410*a* may also be 2D, and each of the AR alignment object 410*a* and the 2D alignment object 410*b* may have a shape that is non regular polygon (i.e., a polygon that is not direct equiangular (all angles are equal in measure) and not equilateral (all sides have the same length)).

The stationary alignment object 420*b* may be placed at a fixed location on the display 108 (e.g., above the 2D alignment object 410*b*). A relative location of the moving alignment object 420*a* with respect to the stationary alignment object 420*b* (therefore, a displacement between the moving alignment object 420*a* and the stationary alignment object 420*b*) on the display 108 may be calculated based on the location of the stationary alignment object 420*b* on the display 108, the current orientation dataset and the predetermined orientation dataset. The moving alignment object 420*a* may have a shape of a solid circle. The stationary alignment object 420*b* may have a shape of a hollow circle. In embodiments, the stationary alignment object 420*b* may have a size that is similar to or slightly larger than that of the moving alignment object 420*a*. It is noted that the location of the stationary alignment object 420*b* may be set at any location on the display 108.

In some embodiments, the processor 102 may control the display 108 to display a message instructing the user to move and/or tilt the mobile device 100 such that the 2D alignment object 410*b* encloses the AR alignment object 410*a*, and the stationary alignment object 420*b* encloses the moving alignment object 420*a*.

Specifically, in the embodiment of FIG. 4, when the user moves the mobile device 100 parallel to the horizontal plane, the 2D alignment object 410*b* does not "move" on the display 108, and the AR alignment object 410*a* moves on the display 108 correspondingly since the reference object 300 moves within the field of view of the camera 110 and the location of the AR alignment object 410*a* is fixed relative to the reference object 300. In the embodiment of FIG. 4, when the user moves the mobile device 100 to the right, the AR alignment object 410*a* moves to the left towards the 2D alignment object 410*b*.

Moreover, in the embodiment of FIG. 4, when the user rotates the mobile device 100 with respect to any one of the longitudinal axis and the transverse axis, the stationary alignment object 420*b* does not "move" on the display 108, and the moving alignment object 420*a* moves on the display 108 correspondingly. In the embodiment of FIG. 4, the mobile device 100 may currently be placed parallel to the horizontal plane, and a tilting motion (causing the pitch value to change) of the mobile device causes the moving alignment object 420*a* to move towards the stationary alignment object 420*b*. It is noted that the implementation of the above operations may be done with the motion sensor 206 and are readily known in the related art, details thereof are omitted herein for the sake of brevity.

Then, in step 214, the processor 102 determines whether the AR alignment object 410*a* is moved to be enclosed by the 2D alignment object 410*b*, and the moving alignment object 420*a* is moved to be enclosed by the stationary alignment object 420*b*.

In embodiments, the determination in step 214 may be made by determining whether pixels constituting a contour of the AR alignment object 410*a* are all within a hollow space defined by the inner pixels of the 2D alignment object 410*b*, and whether pixels constituting a contour of the moving alignment object 420*a* are all within a hollow space defined by the inner pixels of the stationary alignment object 420*b*.

That is to say, based on the current orientation dataset and the designated orientation dataset, the processor 102 is configured to calculate the displacement between the stationary alignment object 420b and the moving alignment object 420a, and to control the display 108 to display the moving alignment object 420a and the stationary alignment object 420b in the AR images based on the displacement. The displacements are determined such that when the AR alignment object 410a is moved to be enclosed by the 2D alignment object 410b, and when the moving alignment object 420a is moved to be enclosed by the stationary alignment object 420b, the mobile device 100 is then in the designated orientation and in a location that is capable of capturing the images that include both the reference object 300 and the part of the foot from the specific perspective. Generally, by generating the AR foot placement object 310 and the AR alignment object 410a at different specific locations related to the reference object 300, it may be ensured that when the AR alignment object 410a is in the specific location of the 2D alignment object 410b on the display 108 (e.g., the middle), the mobile device 100 may be considered to be in an appropriate location for capturing an image of the foot. The operation of moving the AR alignment object 410a to be enclosed by the 2D alignment object 410b is similar to the operations of a sight and a target. The operation of moving the stationary alignment object 420b to be enclosed by the moving alignment object 420b is similar to the operation of a bubble level (i.e., an instrument used to indicate whether the mobile device 100 is tilted at a specific angle). It is noted that in the embodiment of FIG. 4, where the image of the heel of the left foot is to be taken, the designated orientation may be represented using a pitch value of 0 degrees, and a roll value of –18±3 degrees. On the other hand, in the case that the image of the heel of the right foot is to be taken, the designated orientation may be represented using a pitch value of 0 degrees, and a roll value of 18±3 degrees. In some embodiments, the processor 102 may further control the display 108 to display the current orientation dataset and the predetermined orientation dataset in order to further assist the user to move/tilt the mobile device 100.

As such, when the user moves/tilts the mobile device 100 such that the determination in step 214 is affirmative, the processor 102 controls the camera 110 to capture an image of the foot in step 216. Using the method of FIG. 2, the image of the foot may be ensured to be taken from the specific perspective while the mobile device is in the designated orientation and the correct location. In this embodiment, the image of the foot contains the associated part of the foot and the reference object 300. That is to say, in this embodiment, the AR alignment object 410a, the 2D alignment object 410b, the moving alignment object 420a and the stationary alignment object 420b are not present in the image of the foot, but may still be present in some alternate embodiments.

In step 218, the processor 102 determines whether a predetermined number of images are taken. In this embodiment, the determination is made by determining whether six different images, three for each foot, are taken. When the determination is affirmative, the flow proceeds to step 222. Otherwise, in response to determination that a predetermined number of images are yet to be taken, the flow goes back to step 209 to obtain another foot image instruction that indicates another associated part of the foot, a same associated part of the other foot, or another associated part of the other foot for image-taking.

Figure 5:
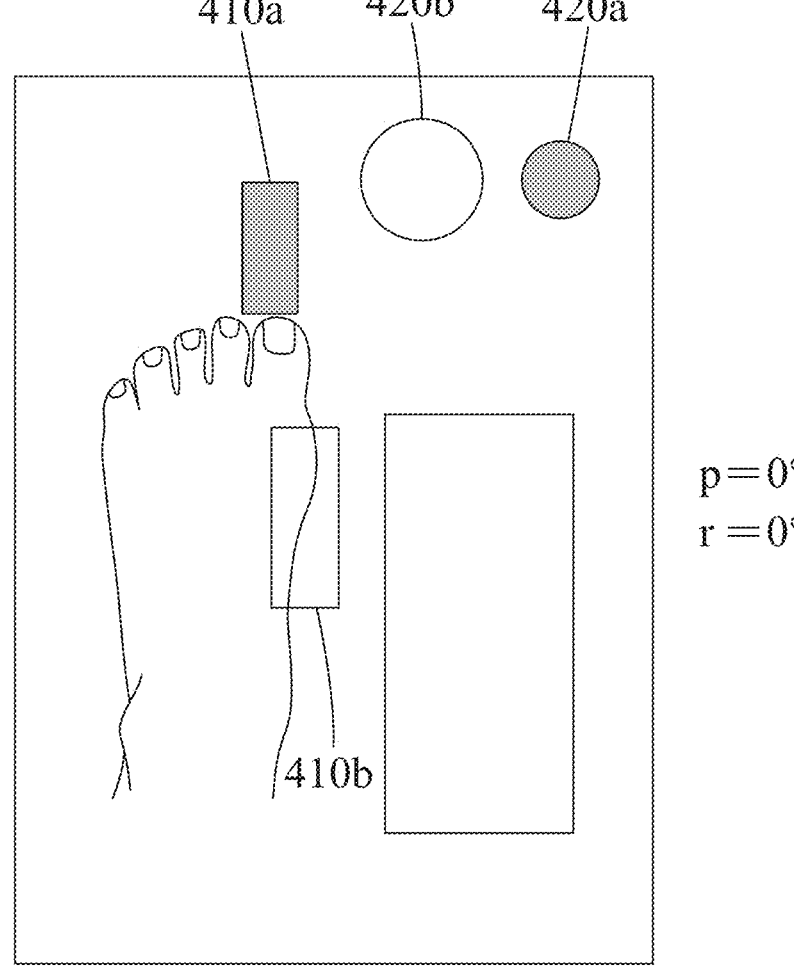
FIG. 5 illustrates an exemplary AR image for an instep of a left foot.

FIG. 5 illustrates the display 108 displaying the AR image for an instep of a left foot. In the example of FIG. 5, the mobile device 100 is placed in the portrait mode, the designated orientation may be represented using a pitch value of 0 degrees, and a roll value of 0±3 degrees. On the other hand, in the case that the image of the instep of the right foot is to be taken, the designated orientation may be represented using a pitch value of 0 degrees, and a roll value of 0±3 degrees.

Figure 6:
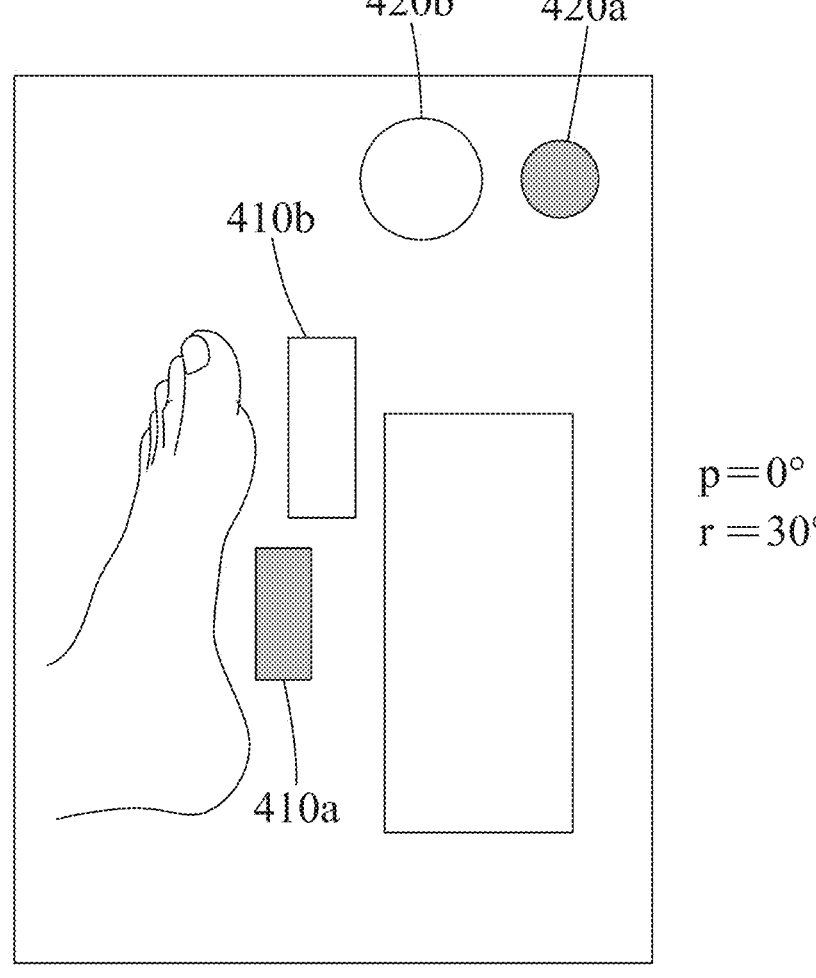
FIG. 6 illustrates an exemplary AR image for an arch of a left foot.

FIG. 6 illustrates the display 108 displaying the AR image for the arch of a left foot. In the example of FIG. 6, the mobile device 100 is placed in the portrait mode, the designated orientation may be represented using a pitch value of 0 degrees, and a roll value of 30±3 degrees. On the other hand, in the case that the image of the arch of the right foot is to be taken, the designated orientation may be represented using a pitch value of 0 degrees, and a roll value of –30±3 degrees. It is noted that in this case, the AR foot placement object 310 may have a shape that differs from the one shown in FIG. 3.

After six images are taken and the determination of step 218 is affirmative, in step 222, the processor 102 controls the communication unit 112 to transmit the images and the information associated with the reference object 300 (e.g., the set of dimensions) detected in the images captured by the camera 110 to the remote server. As such, the remote server is configured to process the images to determine a number of size parameters associated with the feet of the user.

It is noted that operations of processing images of each foot for determining a number of size parameters associated with both feet are well known in the related art, details thereof are omitted herein for the sake of brevity. In some embodiments, the processing of the images may be implemented using the method for calculating foot size as mentioned in United States Patent Publication No. U.S. Pat. No. 10,008,040B2, the disclosure of which is incorporated herein by reference.

To sum up, embodiments of the disclosure provide a method and a mobile device for capturing an image of a foot from a specific perspective using augmented reality. In the method, with the placement of the reference object (which may be a paper banknote or other readily available objects), an interface that includes an AR foot placement object is provided on a display of the mobile device. After the user places his/her foot on the AR foot placement object, the processor generates an AR alignment object, a 2D alignment object, a moving alignment object and a stationary alignment object. By instructing the user to move and/or tilt the mobile device such that the 2D alignment object encloses the AR alignment object, and the stationary alignment object encloses the moving alignment object, the mobile device may be moved into a location and tilted into a designated orientation such that the resulting image can include sufficient information of the foot, therefore allowing the subsequent processing of the image to obtain more complete information of the foot. Additionally, the interface provided by the method is intuitive and easier to implement by the user, and no additional setup aside from the reference object is needed.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method, performed by a mobile device, the method comprising the steps of:

controlling a camera of the mobile device to activate and capture images;

controlling a display of the mobile device to present the images captured by the camera;

detecting a reference object in the images captured by the camera;

determining a set of dimensions for the reference object based on a type of the reference object;

generating an augmented reality (AR) space based on the set of dimensions of the reference object;

obtaining a foot image instruction that indicates a specific foot and an associated part of the specific foot for image-taking;

generating an AR foot placement object in the AR space based on the foot image instruction, wherein the AR foot placement object is presented on the display in proximity to the reference object;

detecting a foot of a user on the AR foot placement object;

presenting to the display, an AR alignment object, a two-dimensional (2D) alignment object, a moving alignment object and a stationary alignment object, wherein the AR alignment object is located at a fixed relative position with respect to the reference object in the AR space, a location of the 2D alignment object on the display and a location of the stationary alignment object on the display are fixed, and wherein a location of the moving alignment object on the display is calculated based on the location of the stationary alignment object on the display, a current orientation dataset, and a predetermined orientation dataset; and detecting that the AR alignment object is enclosed by the 2D alignment object, and that the moving alignment object is enclosed by the stationary alignment object; and controlling the camera to capture an image related to the foot in accordance with the AR object being enclosed by the 2D alignment object and the moving object being enclosed by the stationary alignment object.

2. The method of claim 1, wherein the reference object is a paper banknote, and detecting the reference object comprises accessing a database included in data storage to determine the type of the reference object, and obtain the set of dimensions of the reference object.

3. The method of claim 1, wherein generating the AR space comprises generating the AR foot placement object that is cross shaped, and placing the AR foot placement object on one side of the reference object.

4. The method of claim 1, further comprising:

determining a predetermined number of images are yet to be taken; and obtaining a second foot image instruction that indicates one of: another associated part of the specified foot, a same associated part of a different specified foot, or another associated part of the different specified foot, and generating and displaying the AR alignment object based on the second foot image instruction.

5. The method of claim 4, wherein the associated part of the specified foot includes a heel of the specified foot, an instep of the specified foot and an arch of the specified foot, and the predetermined number of images is six.

6. The method of claim 5, further comprising displaying a message instructing the user to place the mobile device in one of the portrait mode and a landscape mode based on the associated part of the specified foot.

7. The method of claim 4, further comprising transmitting the images and information that is associated with the reference object detected in the images captured by the camera to a remote server for processing and determining a number of size parameters associated with the feet of the user.

8. The method of claim 1, wherein detecting the foot on the AR placement object includes generating the AR alignment object with a shape that is a nonregular polygon.

9. The method of claim 1, wherein detecting the foot on the AR placement object includes generating the AR alignment object with a shape of a solid rectangular cuboid.

10. The method of claim 1, wherein each of the current orientation dataset of the mobile device and the predetermined orientation dataset includes at least a pitch value and a roll value and the current orientation dataset is sensed by a motion sensor of the mobile device.

11. A mobile device comprising:

a camera;

a display;

a processor; and a data storage that stores machine executable instructions, wherein the processor executing the machine executable instructions, causes the mobile device to perform operations comprising:

controlling the camera to activate and capture images, and controlling the display to display the images captured by the camera;

in response to detection of a reference object in the images captured by the camera, determining a set of dimensions for the reference object based on a type of the reference object;

generating an augmented reality (AR) space based on the set of dimensions of the reference object;

obtaining a foot image instruction that indicates a specific foot and an associated part of the specific foot for image-taking;

generating an AR foot placement object in the AR space based on the foot image instruction, and controlling the display to display the AR foot placement object in proximity to the reference object;

in response to detection of a foot of a user on the AR foot placement object, presenting to the display, an AR alignment object, and a two-dimensional (2D) alignment object, a moving alignment object and a stationary alignment object, wherein the AR alignment object is located at a fixed relative position with respect to the reference object in the AR space, a location of the 2D alignment object on the display and a location of the stationary alignment object on the display are fixed, and wherein a location of the moving alignment object on the display is calculated based on the location of the stationary alignment object on the display, a current orientation dataset and a predetermined orientation dataset; and in response to detection that the AR alignment object is enclosed by the 2D alignment object, and that the moving alignment object is enclosed by the stationary alignment object, controlling the camera to capture an image related to the foot of the user.

12. The mobile device of claim 11, the reference object being a paper banknote, wherein detecting the reference object comprises a database included in the data storage to determine the type of the reference object, and obtains the set of dimensions of the reference object.

13. The mobile device of claim 11, wherein the generating the AR space comprises generating the AR foot placement object that is cross shaped, and placing the AR foot placement object on one side of the reference object.

14. The mobile device of claim 11, wherein the operations further comprise: in response to a determination that a predetermined number of images are yet to be taken, obtaining another foot image instruction that indicates one of:

another associated part of the specified foot, a same associated part of a different specified foot, or another associated part of the different specified foot.

15. The mobile device of claim 14, wherein the associated part of the specified foot includes a heel of the specified foot, an instep of the specified foot and an arch of the specified foot, and the predetermined number of images is six.

16. The mobile device of claim 15, wherein the processor further controls the display to display a message instructing the user to place the mobile device in one of the portrait mode and a landscape mode based on the associated part of the specified foot.

17. The mobile device of claim 14, wherein the processor further transmits the images and information that is associated with the reference object detected in the images captured by the camera to a remote server for processing and determining a number of size parameters associated with the feet of the user.

18. The mobile device of claim 11, wherein detecting the foot of the user on the AR placement object includes generating the AR alignment object with a shape that is a nonregular polygon.

19. The mobile device of claim 11, wherein detecting the foot of the user on the AR placement object includes generating the AR alignment object with a shape of a solid rectangular cuboid.

20. The mobile device of claim 11, wherein each of the current orientation dataset of the mobile device and the predetermined orientation dataset includes at least a pitch value and a roll value and the current orientation dataset is sensed by a motion sensor of the mobile device.

* * * * *